Patented July 26, 1949

2,477,330

UNITED STATES PATENT OFFICE 2,477,330

REMOVAL OF HYDROGEN HALIDE FROM ORGANO-SUBSTITUTED POLYSILOXANES

Charles D. Doyle, Schenectady, N. Y., assignor to General Electric Company, a corporation of New York No Drawing. Application August 7, 1947, Serial No. 767,341

9 Claims. (Cl. 260—46.5)

This invention relates to the removal of hydrogen halide from organo-substituted polysiloxanes. More particularly, the invention is concerned with a process for removing hydrogen halide contained in organo-substituted polysiloxanes obtained by the hydrolysis of a mass comprising an organo-halogenosilane, which process comprises (1) contracting the said polysiloxane with a tertiary alkyl alcohol containing from 4 to 6 carbon atoms and (2) heating the product obtained in (1) to remove or drive off substantially all the alkyl halide present therein.

In the preparation of organo-substituted polysiloxanes by the hydrolysis of an organohalogenosilane, there are obtained considerable amounts of hydrogen halide in the hydrolysis product, most of which can be removed either by distillation or by washing with water. For example, in the preparation of resinous organo-substituted polysiloxanes, (e. g., resinous methyl-substituted polysiloxanes) by the hydrolysis of a mixture of organohalogenosilanes, for instance, a mixture comprising dimethyldichlorosilane and methyltrichlorosilane, there is usually obtained an hydrolysis product containing a large amount of hydrogen halide which can be reduced to about 0.5 per cent, by weight, by distillation, i. e., by heating at temperatures of the order of about 75° to 100° C. However, the presence of this amount of hydrogen halide is highly undesirable since it reduces the shelf-life of the resin by causing gelation of the polysiloxane in a relatively short period of time.

Further washing with water may reduce this amount of hydrogen halide to a concentration of less than 0.005 per cent which the resinous polysiloxane can tolerate without danger of gelation. Although washing with water removes the critical excess of hydrogen halide, such procedure is attended by the disadvantage that difficulty is encountered in removing the last traces of wash water. The use of neutralizing agents for neutralizing the hydrogen halide is also undesirable because of the danger of causing gelation of the polysiloxane by the neutralizing agent itself.

Even in the preparation of liquid, oily, non-resinous organo-substituted polysiloxanes (used, e. g., as lubricants, etc.) by hydrolysis of a substantially pure diorganodihalogenosilane, there are occluded in the hydrolysis product small amounts of hydrogen halide, which, if not completely removed, will cause the liquid organo-substituted polysiloxane to increase in viscosity under the influence of heat. Thus, the use of such materials for lubricating purposes under conditions requiring operation at elevated temperatures would result in an increase in viscosity with possible danger of gelation after relatively short periods of time if these last traces of hydrogen halide were not removed.

I have now discovered that I am able to remove essentially all hydrogen halide contained in an organosubstituted polysiloxane obtained by hydrolyzing one or more organohalogenosilanes, by first contacting and intimately dispersing within the polysiloxane a tertiary alkyl alcohol containing from 4 to 6 carbon atoms, and thereafter heating the mixture of the said polysiloxane and tertiary alkyl alcohol at a temperature and for a period of time sufficient to remove substantially all the tertiary alkyl halide present therein. By means of my process I am able to cause the small amounts of hydrogen halide contained in the polysiloxane to react readily with the alcohol to yield the alkyl halide which is then volatilized quite easily under the heating conditions mentioned above. The ease with which the hydrogen halide is removed by my process is surprising and unexpected in view of the fact that more drastic action like heating of the organo-substituted polysiloxane, without the tertiary alkyl alcohol being present therein, fails to remove adequately the hydrogen halide, and instead results in an undesirable increase in viscosity and degree of condensation of the polysiloxane.

Among the tertiary alkyl alcohols which may be employed in the practice of my invention may be mentioned tertiary butyl alcohol, tertiary amyl alcohol and its isomers, tertiary hexyl alcohol and its isomers, and mixtures of the alcohols. I prefer to use tertiary butyl alcohol because of its low expense and availability, and because the tertiary butyl halide formed from the reaction of the tertiary butyl alcohol with the hydrogen halide can be volatilized quite easily from the polysiloxane under comparatively low temperature conditions.

The manner in which my invention may be practiced may be varied. After the hydrolysis of the halogenosilanes to form the organopolysiloxanes, I prefer to strip-distill the hydrolysis product of the organohalogenosilanes at a temperature ranging from about 100° to 180° C. to remove excess water, any solvent employed in the hydrolysis step, and a substantial portion of the hydrogen halide. For best results the organo-substituted polysiloxane should be almost substantially free of water prior to the addition of the tertiary alkyl alcohol in order to prevent hydrolysis of the alkyl halide in case the treated polysiloxane is allowed to stand for any appreciable length of time.

Thereafter the tertiary alkyl alcohol, in an amount depending on the percent hydrogen halide present in the organo-substituted polysiloxane, is added, preferably when the polysiloxane is at a temperature of from about 50° to 90° C. Under usual conditions on a weight basis, I may add from 1 to 10 percent, preferably from 2 to 7 percent, of the tertiary alcohol, based on the weight of the organo-substituted polysiloxane. To effect ease in handling in many cases, solvents such as xylene, petroleum spirits, etc., up to 10 percent, by weight, may be used to reduce the viscosity of too viscous polysiloxanes. The mixture of polysiloxane and tertiary alcohol is thoroughly agitated and then subjected to another strip-distillation up to about 200° C., preferably from about 160° to 180° C., to remove the last traces of the tertiary alkyl halide formed. This may require heating of the mass for from 15 minutes to 2 hours. Thereafter, it is often found expedient, depending on the ultimate use of the polysiloxane, to dissolve the polysiloxane in a solvent, e. g., an aromatic solvent, for instance, xylene, benzene, toluene, etc.; paraffin solvents, etc.

In order that those skilled in the art may better understand how the instant invention may be practiced, the following example is given by way of illustration and not by way of limitation.

Example

An organo-substituted polysiloxane was prepared by hydrolyzing a mixture of chlorosilanes comprising 30 mol per cent dimethyldichlorosilane, 50 mol per cent methyltrichlorosilane and 20 mol per cent phenyltrichlorosilane in a solvent medium comprising diethyl ether of ethylene glycol and an amount of water in slight excess of that required to effect complete hydrolysis of all the chlorine present in the aforementioned chlorosilanes (about 110 to 130 per cent of the stoichiometric requirement). The hydrolysis product was strip-distilled in a vessel up to a temperature of about 180° C., removing the water, solvent, and other products formed or present in the mass. The resin thus obtained was dissolved in xylene to yield a solution containing 90 per cent solids (resin). A portion of the resin solution thus obtained was thoroughly mixed (at a temperature of about 80° C.) with about 5 per cent, by weight, tertiary butyl alcohol based on the weight of the resin. This latter mixture was then again strip-distilled up to about 180° C. while removing the substances evolved, which comprised mainly tertiary butyl chloride formed from the reaction of the HCl and the tertiary butyl alcohol, and varying amounts of the latter alcohol. Testing of the resin showed that it was essentially free of HCl.

A sample of the alcohol-treated resin solution together with a sample of the same resin solution which had not been treated with the tertiary butyl alcohol were each dissolved in an amount of an aromatic solvent comprising xylene to yield a solution having a solids content of about 80 per cent. These samples were allowed to stand at room temperature (about 27° C.) and their shelf-life determined by checking any perceptible changes in viscosity. After five days it was found that the resin which had not been treated with the tertiary butyl alcohol had gelled. On the other hand, the resin from which substantially all the hydrogen chloride had been removed by means of the tertiary butyl alcohol did not gel even after six months, thus showing the eminent superiority in results obtained by using my process.

It will be apparent to those skilled in the art that my process is not limited to removing hydrogen halide from or increasing the shelf-life of the specific organo-substituted polysiloxane resin disclosed above. My process may advantageously be employed in the removal of small traces of hydrogen halide, for example, hydrogen chloride, hydrogen bromide, etc., present in other organo-substituted polysiloxanes obtained by hydrolysis with water of organohalogenosilanes of mixtures of such materials, for example, methylchlorosilanes (e. g., dimethyldichlorosilane, trimethylchlorosilane, etc.), methylbromosilanes, phenylchlorosilanes (e. g., phenyltrichlorosilane, diphenyldichlorosilanes, etc.) methylphenylchlorosilanes, mixtures of methylchlorosilanes and phenylchlorosilanes, allylchlorosilanes, etc. My invention is particularly applicable to resins obtained by the hydrolysis of a mixture of chlorosilanes having an average hydrocarbon-to-silicon ratio of from 1 to 1.7 hydrocarbon radicals per silicon atom and comprising from about 20 to 50 mol per cent dimethyldichlorosilane, 20 to 60 mol per cent methyltrichlorosilane, and 10 to 40 mol per cent phenyltrichlorosilane, the total per cents being equal to 100 per cent.

Other organopolysiloxanes obtained by hydrolysis of organohalogenosilanes which may be treated and rendered resistant to gelation or viscosity increase (because of the presence of small amounts of hydrogen halide) by my process may be found in Marsden Patents 2,406,621 and 2,390,378, and Sauer Patent 2,398,672, as well as in Wilcock applications Serial No. 699,356, filed September 25, 1946, now Patent Number 2,471,850, and Serial No. 656,162, filed March 21, 1946; Patnode applications Serial Nos. 463,813, now abandoned, 463,814, now Patent Number 2,469,888, and 463,815, now abandoned, filed October 29, 1942, etc. The foregoing patents and applications are all assigned to the same assignee as the present invention.

Resins freed from hydrogen halide in accordance with my process have utility in molding, laminating, and coating applications as is more particularly described in Rochow Patent 2,258,218, issued October 7, 1941, and assigned to the same assignee as the instant application.

What I claim as new and desire to secure by Letters Patent of the United States is:

1. The process for removing hydrogen halide contained in a substantially anhydrous organo-substituted polysiloxane comprising the substantially dehydrated product of hydrolysis of an hydrocarbon-substituted halogenosilane, which process comprises (1) contacting the said polysiloxane with a tertiary alkyl alcohol containing from 4 to 6 carbon atoms and (2) heating the product obtained in (1) to remove the tertiary alkyl halide present therein formed as a result of the reaction between the tertiary alkyl alcohol and the hydrogen halide present in the aforementioned polysiloxane.

2. The process for removing hydrogen chloride from a substantially anhydrous organo-substituted polysiloxane comprising the substantially dehydrated product of hydrolysis of hydrocarbon-substituted chlorosilane, which process comprises (1) contacting the said polysiloxane with tertiary butyl alcohol and (2) heating the product obtained in (1) until substantially all the tertiary butyl chloride present therein has been removed, the tertiary butyl chloride being formed as a result of the reaction between the tertiary butyl alcohol and the hydrogen chloride present in the aforementioned polysiloxane.

3. The process for removing hydrogen chloride from a methyl-substituted polysiloxane comprising the substantially dehydrated product of hydrolysis of a substantially anhydrous methylchlorosilane, which proceess comprises (1) contacting the said polysiloxane with a tertiary alkyl alcohol containing from 4 to 6 carbon atoms and (2) heating the product obtained in (1) until substantially all the tertiary alkyl halide present therein has been removed, the tertiary alkyl halide being formed as a result of the reaction between the tertiary alkyl alcohol and the hydrogen chloride present in the aforementioned polysiloxane.

4. The process for removing hydrogen halide from a substantially anhydrous methyl-substituted polysiloxane comprising the substantially dehydrated product of hydrolysis of a methylhalogenosilane, which process comprises (1) contacting the said polysiloxane, previously rendered substantially anhydrous, with tertiary butyl alcohol and (2) heating the product obtained in (1) until substantially all the tertiary butyl halide present therein has been removed, the tertiary butyl halide being formed as a result of the reaction between the tertiary butyl alcohol and the hydrogen halide present in the aforementioned polysiloxane.

5. The process for removing hydrogen halide from a substantially anhydrous methyl- and phenyl-substituted polysiloxane comprising the substantially dehydrated product of hydrolysis of a mixture of a methylhalogenosilane and a phenylhalogenosilane, which process comprises (1) contacting the said polysiloxane with tertiary butyl alcohol and (2) heating the product obtained in (1) until substantially all the tertiary butyl halide present therein has been removed, the tertiary butyl halide being formed as a result of the reaction between the tertiary butyl alcohol and the hydrogen halide present in the aforementioned polysiloxane.

6. The process for removing hydrogen chloride from a substantially anhydrous resinous methyl- and phenyl-substituted polysiloxane comprising the substantially dehydrated product of hydrolysis of a mixture of chlorosilanes containing dimethyldichlorosilane and phenyltrichlorosilane, the said polysiloxane having a ratio of from 1.0 to 1.7 total methyl and phenyl groups per silicon atom, which process comprises (1) treating the said polysiloxane, previously rendered substantially anhydrous, with an amount of tertiary butyl alcohol ranging, by weight, from approximately 1 to 10 per cent of the weight of the polysiloxane, and (2) heating the product obtained in (1) until substantially all the tertiary butyl chloride present therein has been removed, the tertiary butyl chloride being formed as a result of the reaction between the tertiary butyl alcohol and the hydrogen chloride present in the aforementioned polysiloxane.

7. The process for removing hydrogen chloride from a resinous substantially anhydrous hydrocarbon-substituted polysiloxane having an average ratio of from 1.0 to 1.7 organic groups substituted on each silicon atom and containing methyl groups attached to silicon atoms by C-Si linkages, said polysiloxane comprising the substantially dehydrated product of hydrolysis of a mixture of organochlorosilanes containing dimethyldichlorosilane, which process comprises (1) treating the said organo-substituted polysiloxane, previously rendered anhydrous, with tertiary butyl alcohol in an amount equal to from 1 to 10 per cent, by weight, based on the weight of the resinous polysiloxane and (2) heating the product obtained in (1) at a temperature ranging from about 60° to 200° C. for a period of time sufficient to remove substantially all the tertiary butyl chloride present therein, the tertiary butyl chloride being formed as a result of the reaction between the tertiary butyl alcohol and the hydrogen chloride present in the aforementioned polysiloxane.

8. The process for removing hydrogen chloride from a substantially anhydrous resinous methyl- and phenyl-substituted polysiloxane comprising the substantially dehydrated product of hydrolysis of a mixture of chlorosilanes containing dimethyldichlorosilane, methyltrichlorosilane and phenyltrichlorosilane, which process comprises (1) treating the said polysiloxane with about 2 to 7 per cent, by weight, tertiary butyl alcohol based on the weight of the resinous polysiloxane and (2) heating the product obtained in (1) at a temperature ranging from about 80° to 180° C. until substantially all the tertiary butyl chloride present therein has been removed, the tertiary butyl chloride being formed as a result of the reaction between the tertiary butyl alcohol and the hydrogen chloride present in the aforementioned polysiloxane.

9. The process for increasing the shelf-life of a substantially anhydrous resinous methyl- and phenyl-substituted polysiloxane comprising the substantially dehydrated product of hydrolysis of a mixture of chlorosilanes containing about 20 to 50 mol per cent dimethyldichlorosilane, 20 to 60 mol per cent methyltrichlorosilane, and 10 to 40 mol per cent phenyltrichlorosilane, which process comprises (1) treating the said polysiloxane with from about 2 to 7 per cent, by weight, tertiary alcohol based on the weight of the resinous polysiloxane and (2) heating the product obtained in (1) to a temperature ranging up to 180° C. for a time sufficient to remove substantially all the tertiary butyl chloride present therein, the tertiary butyl chloride being formed as a result of the reaction between the tertiary butyl alcohol and the hydrogen chloride present in the aforementioned polysiloxane.

CHARLES D. DOYLE.

REFERENCES CITED

The following references are of record in the file of this patent:

UNITED STATES PATENTS

| Number | Name | Date |
|---|---|---|
| 2,383,827 | Sprung | Aug. 28, 1945 |
| 2,398,672 | Sauer | Apr. 16, 1946 |

OTHER REFERENCES

Sauer, Journ. American Chem. Soc. Jan. 1946, vol. 68 pp. 138–139.

Gillman, Organic Chemistry, Wiley, 1938, vol. I, page 823.

Certificate of Correction

Patent No. 2,477,330

July 26, 1949

CHARLES D. DOYLE

It is hereby certified that errors appear in the printed specification of the above numbered patent requiring correction as follows:

Column 4, line 16, for the word "of" first occurrence, read *or*; column 5, line 11, after "a" strike out "substantially anhydrous" and insert the same in line 9, before "methyl-substituted"; column 6, line 48, after "tertiary" insert *butyl*; and that the said Letters Patent should be read with these corrections therein that the same may conform to the record of the case in the Patent Office.

Signed and sealed this 3rd day of January, A. D. 1950.

[SEAL]

THOMAS F. MURPHY,
*Assistant Commissioner of Patents.*